United States Patent [19]

Yamashita et al.

[11] Patent Number: 4,948,027

[45] Date of Patent: Aug. 14, 1990

[54] DEVICE FOR RETAINING AN ATTACHMENT MEMBER

[75] Inventors: Sachihiro Yamashita; Hideo Nakamura; Masayuki Enomoto, all of Saitama, Japan

[73] Assignee: Honda Giken Kogyo Kabushiki Kaisha, Japan

[21] Appl. No.: 389,290

[22] Filed: Aug. 3, 1989

[30] Foreign Application Priority Data

Aug. 24, 1988 [JP] Japan .................. 63-110839

[51] Int. Cl.⁵ .................................. B23K 37/04
[52] U.S. Cl. .................. 228/44.3; 228/49.1; 228/5.5; 228/106; 29/787; 29/238; 29/240; 269/234; 269/224
[58] Field of Search .......... 228/5.5, 44.3, 49.1, 228/212, 173.5, 106; 29/464, 467, 468, 787, 238, 240; 269/234, 217, 254 R, 224

[56] References Cited

U.S. PATENT DOCUMENTS

| | | | |
|---|---|---|---|
| 2,381,584 | 8/1945 | Fulleton | 269/234 |
| 4,348,959 | 9/1982 | Bommart | 29/238 |
| 4,610,636 | 9/1986 | Craig et al. | 228/49.1 |
| 4,629,109 | 12/1986 | Matsushita | 228/49.1 |

FOREIGN PATENT DOCUMENTS 33096 2/1987 Japan ............... 228/49.1

1033282 8/1983 U.S.S.R. ............... 269/234

Primary Examiner—Richard K. Seidel
Assistant Examiner—Samuel M. Heinrich
Attorney, Agent, or Firm—Steele, Gould & Fried

[57] ABSTRACT

A device for retaining an attachment member having an engagement portion for engagement with an outer circumferential surface of a rod-like member, comprising: a receptacle for receiving a main part of the attachment member with some play; an elastic member for retaining the main part at its first position for keeping the rod-like member and the engagement portion from interfering with each other when the rod-like member is brought into a preliminary position for engagement with the engagement portion; and a pressure unit for bringing the attachment member to its second position for engaging the engagement portion with the rod-like member against a biasing force of the elastic member. When the attachment member is placed in the receptacle, it is held in its first position for not causing any interference between the engagement portion and the rod-like member by being supported by the elastic member. The rod-like member is then placed at a prescribed position. By pushing out the pressure unit against the action of the elastic member, the attachment member is made to assume the second position where the engagement portion is engaged with the rod-like member so that the attachment member may be retained in the receptacle.

5 Claims, 6 Drawing Sheets

DEVICE FOR RETAINING AN ATTACHMENT MEMBER

TECHNICAL FIELD

The present invention relates to a device for positioning and retaining an attachment member having a U-shaped portion when welding the attachment member to an outer circumferential surface of a rod-like member such as a pipe.

BACKGROUND OF THE INVENTION

A hook member made by bending a rod member is often welded to a seat frame consisting of a pipe member for the purpose of attaching the seat to a vehicle body.

Such a hook member is made by bending an intermediate part of a rod-like member into the shape of letter U, and forming an engagement portion for a seat frame by joining its two ends. Typically, an engagement portion is shaped so as to be able to partially wrap around a pipe member in order to ensure a sufficient welding length in welding it to the seat frame.

However, it has been difficult to mechanize and automate the process of positioning the hook member relative to the seat frame because of the interference between the seat frame pipe and the engagement portion. Also, the hook member is so curved and complicated in shape that it cannot stay stable when it is placed unsupported and it is therefore difficult to clamp it to an assembly jig or the like. Consequently, a significant part of the work related to the assembling of the hook member to the seat frame had to be done manually, and it has been difficult to improve manufacturing precision and production efficiency.

BRIEF SUMMARY OF THE INVENTION

In view of such problems of the prior art, a primary object of the present invention is to provide a retaining device which permits mechanization of the process of assembling an attachment member having an engagement portion to an outer circumferential surface of a rod-like member such as a seat frame.

A second object of the present invention is to provide such a retaining device which can be conveniently used to retain an attachment member upon an outer circumferential surface of a rod-like member such as a seat frame to weld them together with a high level of positional precision.

According to the present invention, such an object can be accomplished by providing a device for retaining an attachment member having a first engagement portion for engagement with an outer circumferential surface of a rod-like member at its one end and a second engagement portion for engagement with another member at its other end, comprising: a receptacle for receiving a main part of the attachment member with some play; elastic means such as a rubber piece for retaining the main part of the attachment member at its first position for keeping the rod-like member and the first engagement portion from interfering with each other when the rod-like member is brought into a preliminary position for engagement with the first engagement portion after the attachment member is received in the receptacle; and pressure means for bringing the attachment member to its second position for engaging the first engagement portion with the rod-like member against a biasing force of the elastic means. This device may be conveniently applied to a welding station where the attachment member having a complicated shape is required to be welded to a rod-like member.

When the attachment member is placed in the receptacle, it is held in its first position for not causing any interference between the engagement portion and the rod-like member by being supported by the elastic means. The rod-like member is then placed at a prescribed position without being interfered by the engagement portion of the attachment member. By pushing out the pressure means against the action of the elastic means, the attachment member is made to assume the second position where the engagement portion is engaged with the rod-like member so that the attachment member may be retained in the receptacle. Thus, retaining of the attachment member having a complicated shape can be simply automated, and a desired precision of the position for mounting the attachment member may be ensured.

This is particularly significant when the first engagement portion consists of a hooked portion which is to be wrapped around the rod-like member over a certain angle such as the case found in a seat frame to which striker members and other small pieces having complicated shapes must be welded. According to such a typical embodiment, the main part of the attachment member is provided with at least one U-shaped opening; the receptacle is provided with a bearing surface which supports a bottom surface of a bottom portion of the U-shaped portion and an outer side surface of a side portion of the U-shaped portion; and the pressure means is provided with a pair of tapered surfaces which can contact inner surfaces of the bottom portion and the side portion and is disposed so as to be able to move toward and away from the opening.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
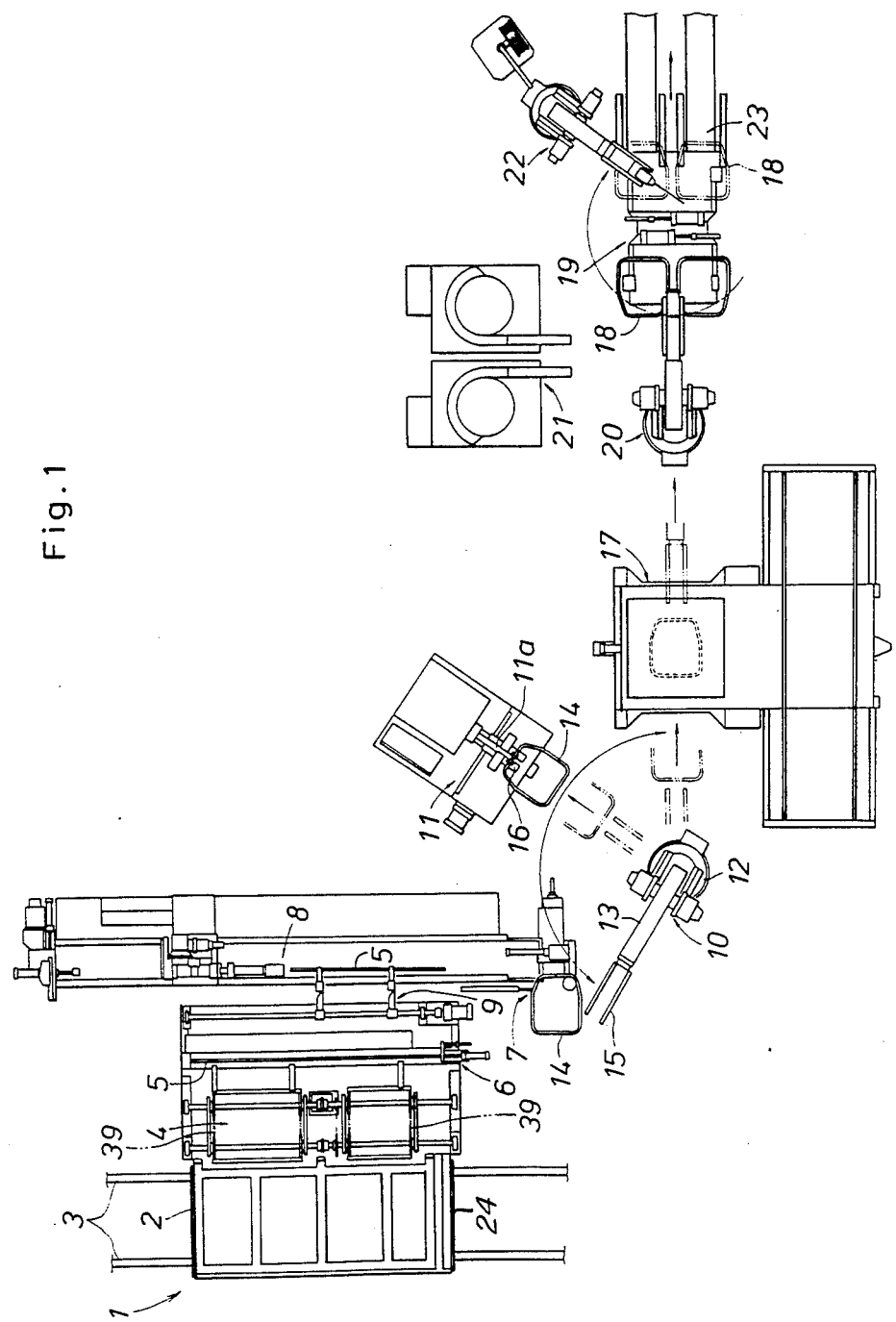
FIG. 1 is a plan view of a seat frame production line to which the device of the present invention is applied.
Figure 2:
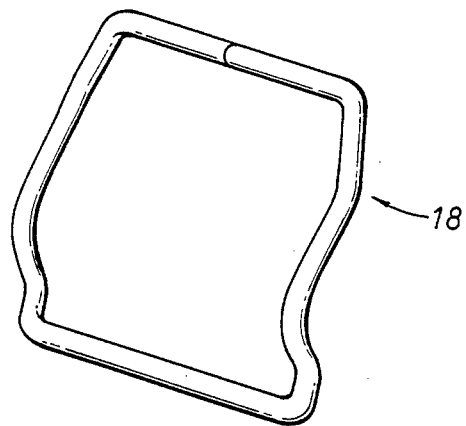
FIG. 2 is a perspective view of a seat frame which can be produced by the production line of FIG. 1.
Figure 6:
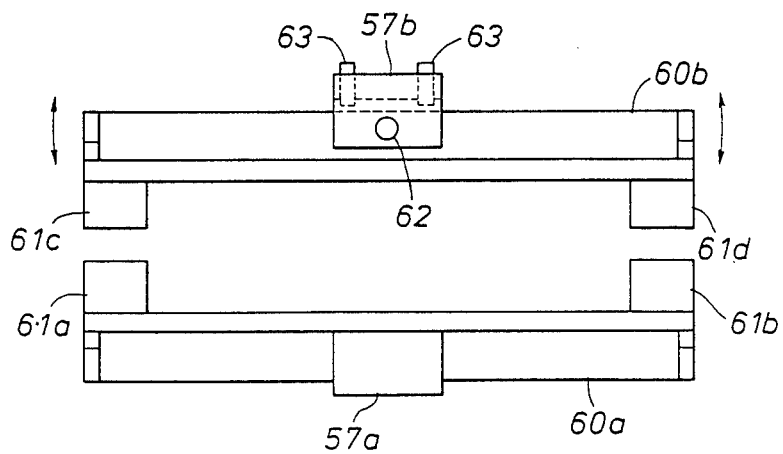
FIG. 6 is an end view as seen from line VI—VI of FIG. 5.

FIG. 1 shows a seat frame production line for producing annular and rectangular three-dimensional pipe frames 18 for vehicle seats, such as the one illustrated in FIG. 2, from straight steel pipe members 5 having a prescribed length. As shown on the left hand side of FIG. 1, in a pipe feed station 1, a pair of rails 3 are laid for a carriage 24 which carries a bin 2 containing a certain number of pipe members 5 so that such pipe members 5 may be fed to this production line without any break.

An elevator unit 4 is provided adjacent to the stationary bin 2 to transfer the pipe members 5 from the bin 2 to a length measuring station 6. The elevator unit 4 comprises endless chains 39 and a plurality of arm members 43 extending therefrom at equal intervals as described hereinafter. Those pipe members 5 with excessive dimensional errors are rejected at the length measuring station 6.

Those pipe members 5 having acceptable dimensional accuracy are picked up, one by one, by a pipe gripper 9 which is adapted to rotate around an axial line in parallel with the pipe member 5, and are passed on to a pipe transfer device 8 for moving the pipe members 5 along its longitudinal direction from the length measuring station 6 to a succeeding NC bender 7 one by one.

The pipe member 5 fed into the NC bender 7 is bent at appropriate parts thereof, and is formed into a two-dimensional frame structure 14. In the present case, the pipe member 5 is formed into an annular and rectangular seat frame. The two-dimensional frame structure 14 is then transferred to a welding station 11 by a robot 10 having a rotatable column 12, a telescopic arm 13 carried by the rotatable column 12, and a hand 15 provided in the free end of the arm 13 for actually gripping the two-dimensional frame structure 14.

The welding station 11 is provided with a retaining jig 16 for abutting together the two ends of the pipe member 5 which tend to stay away from each other because of the elastic property of the pipe member 5 even after the pipe member 5 has been formed into the two dimensional frame structure 14, and a welding head 11a for welding them together.

The two-dimensional frame structure 14 which has been welded into a complete annular shape at the welding station 11 is then carried by the same robot 10 onto a lower metallic die of a press station 17, and is then press formed into a desired three-dimensional frame structure 18 between an upper metallic die which is placed onto the surface of the lower metallic die interposing the two-dimensional frame structure 14 therebetween. The three-dimensional frame structure 18 is then transferred by another robot 20 to an attachment welding station 19 where a small attachment piece fed from a parts feeder 21 is welded to the three-dimensional structure 18 by a welder robot 22, and the seat frame F thus completed is dropped onto a belt conveyer 23.

Now the robot arm 20a is described in the following.

The robot arm 20a comprises a cylinder actuator 45 which is securely attached to a base plate 44 carried by a free end of a rotary shaft 42, and a first clamp device 46 and a second clamp device 47 which are provided at either longitudinal end of piston rods 50a and 50b of the cylinder actuator 45. The rotary shaft 42 is incorporated in an arm 43 of the robot 20.

The cylinder actuator 45 is provided with a cylinder 48 which are closed at its either longitudinal end by an end plate 45a or 45b, a piston 49 received in the cylinder 48, and a pair of piston rods 50a and 50b which project centrally from the longitudinal ends of the piston 49 and project out of the end plates 45a and 45b, respectively. The two chambers defined by the cylinder 48 and the piston 49 are communicated with an external pneumatic circuit not shown in the drawings via associated conduits 51a and 51b so that the piston 49 may be moved along with its piston rods 50a and 50b in either longitudinal direction according to the pneumatic pressure supplied from the conduits 51a and 51b. This cylinder actuator 45 is fixedly secured to the base plate 46 by way of one of its end plates 45a.

The first clamp device 46 comprises a pair of fingers 52a and 52b which are pivotally attached to the associated end plate 45b at their one ends. A middle part of each of the fingers 52a and 52b are coupled with a free end of one of the piston rods 50a by way of a clevis joint 54 and a link plate 53a or 53b. Free ends of the fingers 57a and 57b are provided with a pair of grip jaws 57a and 57b fixedly attached thereto.

The second clamp device 47 is provided with a pair of fingers 57a and 57b which are pivotally attached to the base plate 44 at their middle parts by means of a common pivot pin 56. Base ends of these fingers 57a and 57b are coupled with a free end of the other piston rod 50b by way of a clevis joint 59 and a pair of link plates 58a and 58b, and free ends of these fingers 57a and 57b are provided with a pair of grip jaws 60a and 60b.

The grip jaws 55a and 55b of the first clamp device 46 are adapted to grip a hook member 31 made of a rod member having a relatively small diameter and described in greater detail hereinafter, and the grip jaws 60a and 60b of the second clamp device 47 are adapted to grip the seat frame 18 made of a pipe member having a relatively large diameter. Since the grip jaws 60a and 60b of the second clamp device 47 are required to grip a relatively long object, their working ends are laterally bifurcated, and each such end is provided with a V-block 61a through 61d. The grip jaws 60a and 60b of the second clamp device 47 are pivotally attached to the associated fingers 57a and 57b by way of pivot pins 62 extending in parallel with the longitudinal line of the cylinder device 45 at their middle parts so that any deviation from linearity of the seat frame 18 may be accommodated by tilting of the grip jaws 60a and 60b relative to the associated fingers 57a and 57b. Numeral 63 denotes a stop screw for limiting the possible range of the tilting movement of the grip jaw 60b.

Now the operation of the present embodiment is described in the following.

Figure 5:
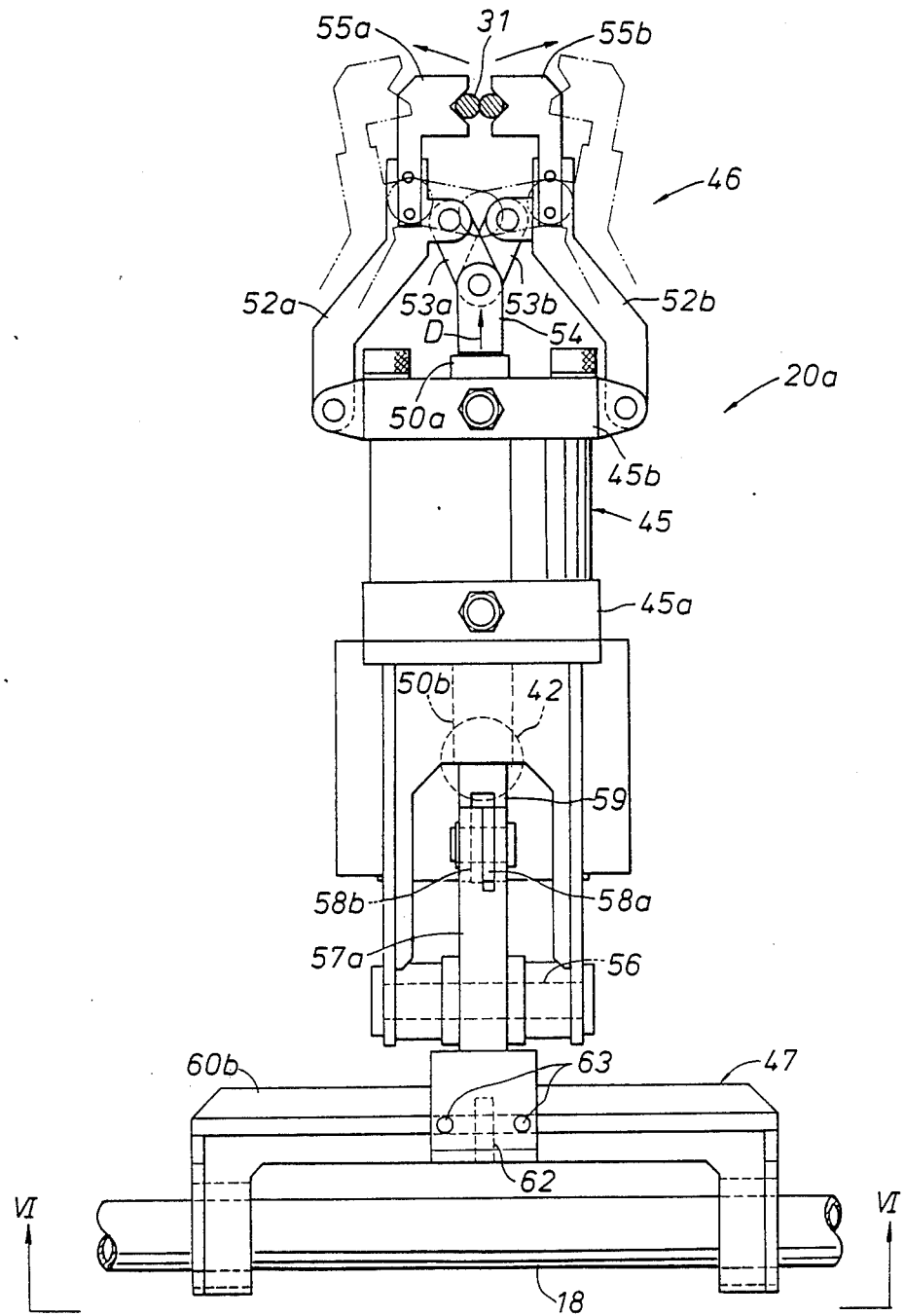
FIG. 5 is a front view of the robot hand of FIG. 4.

In the illustrated condition, the piston 49 is located in a lower part of the cylinder 48, and, thus, one of the piston rods 50a is completely retracted into the cylinder 48 while the other piston rod 50b fully projects out of the cylinder 48. Therefore, the ends of the link plates 53a and 53b of the first clamp device 46 adjacent to the free end of the piston rod 50a are at their lowest positions, and the grip jaws 55a and 55b are at their closed positions interposing the hook member 31 therebetween as illustrated in FIG. 5 in solid lines.

At the same time, the base ends of the fingers 57a and 57b of the second clamp device 47 are pushed away from each other by the piston rod 50b and the link plates 58a and 58b and, as a result of the pivotal movements of the fingers 57a and 57b around the common pivot pin 56, the grip jaws 60a and 60b, along with the V-blocks 51a through 51d are brought close to each other, thereby gripping the seat frame 18 therebetween.

When the piston 49 is pushed upwards along with the piston rods 50a and 50b by introduction of compressed air from the conduit 51a, the fingers 52a and 52b of the first clamp device 46 and the fingers 57a and 57b of the second clamp device 47 are both opened up, and the hook member 31 and the seat frame 18 are released from their respective grip jaws 55a and 55b, and 60a and 60b.

Although the two clamp devices are both closed and opened at the same time, it is also possible to close one of the clamp devices when the other clamp device is opened by modifying the link mechanism of either one of the clamp devices. Also, the longitudinal lines of the objects that are gripped by the first clamp device and the second clamp device are perpendicular to each other in the present embodiment, but it is also possible to modify the angular relationship of the longitudinal lines of the objects that are going to be gripped by the first clamp devices and the second clamp device.

Thus, according to the present embodiment, two clamp device may be actuated by a common power actuator, and the structure of the robot hand can be significantly simplified and reduced in size as compared with conventional multi-hand robot arms, turret structures and hand changing systems. Also, since the two clamp devices may share a common control circuit, the control circuit may be simplified.

Now the retaining device for the attachment welding station 19 is described in the following, but, before describing the device of the present invention, it may be in order to describe the attachment member which is going to be handled by the device of the present invention.

Figure 3:
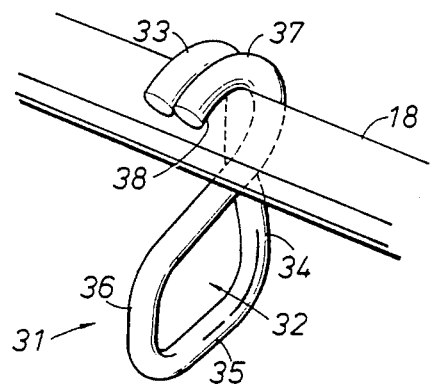
FIG. 3 is a perspective view of an attachment member which is required to be securely attached to the seat frame.
Figure 4:
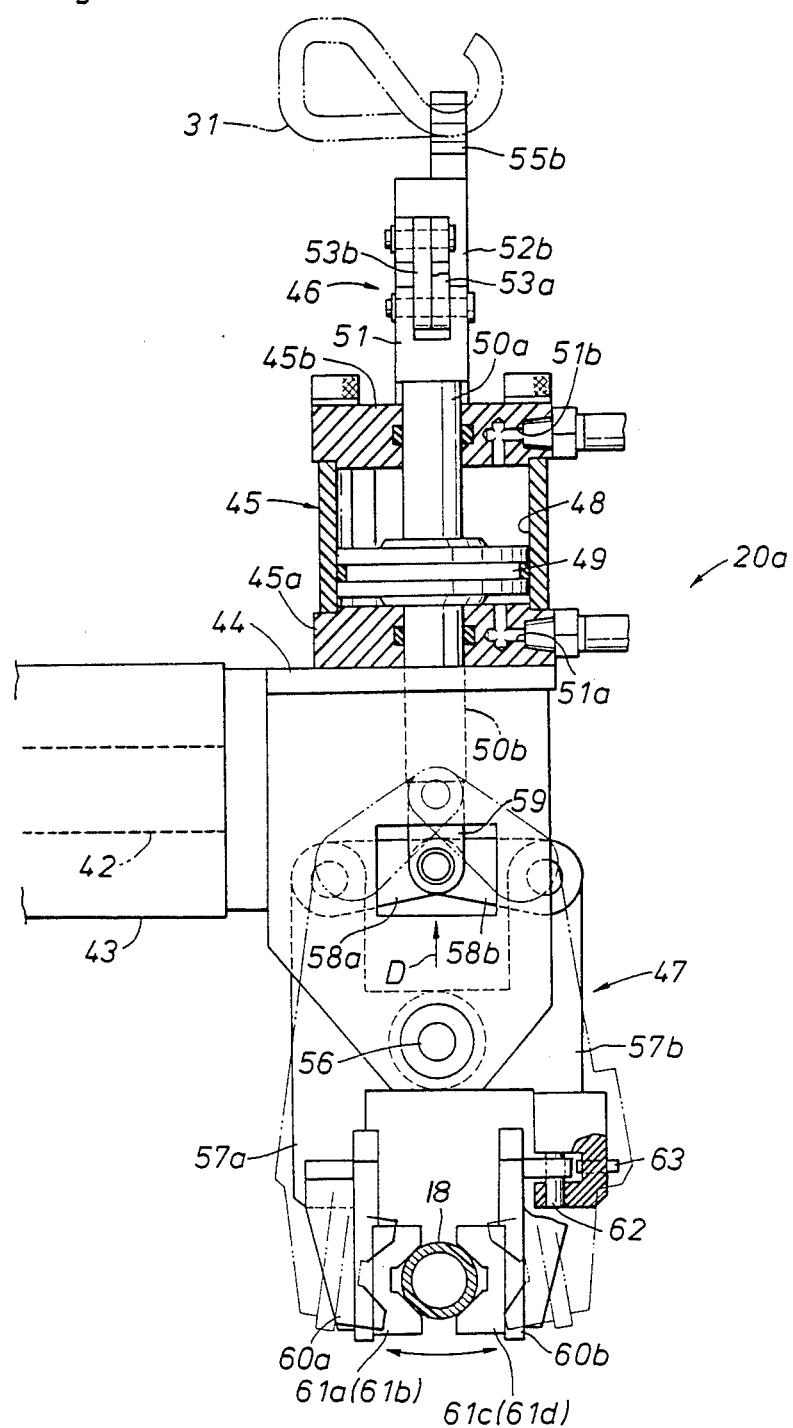
FIG. 4 is a sectional view of a hand of a robot for handling the seat frame and the attachment member illustrated in FIGS. 2 and 3.

The attachment member which is going to be handled by the device of the present invention consists of a hook member 31 for securing a rear seat, which was mentioned earlier, to a vehicle body. Referring to FIG. 3, this hook member 31 is made by bending an intermediate part of a rod member having a certain length into the shape of letter U, and, after closely bringing its two ends together, bending them so as to wrap them around the pipe member of the seat frame 18 by more than half of its entire outer circumference.

The rod member is bent at its one end 33 so as to wrap around the seat frame 18 by more than half of its entire outer circumference, and is then extended downward and tangentially therefrom so as to define a first vertical portion 34. A horizontal portion 35 is formed by bending it, with a slight roundness, perpendicularly therefrom and passing it below the one end 33. A second vertical portion 36 is formed by bending it perpendicularly upward, with a slight roundness, so as to define a second vertical portion 36. Finally, its other end 37 is extended obliquely rearward, and is bent so as to wrap around the seat frame pipe 18a in parallel with the first end 33.

The one end 33 and the other end 37 jointly define an engagement portion 38 for the seat frame pipe 18a, and the first vertical portion 34, the second vertical portion 36 and the horizontal portion 35 jointly define a U-shaped portion 39 for engagement with a vehicle body. The two ends 33 and 37 are closely attached to each other and is offset from each other along the longitudinal direction of the seat frame pipe 32 above the U-shaped portion 39.

Figure 9:
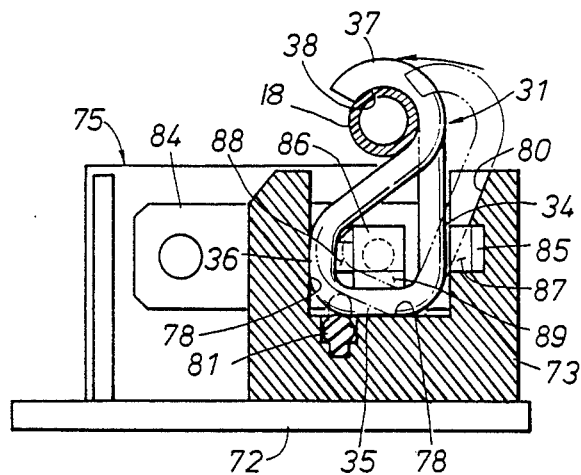
FIG. 9 is a front view of the retaining device of FIG. 7 partly in section.
Figure 7:
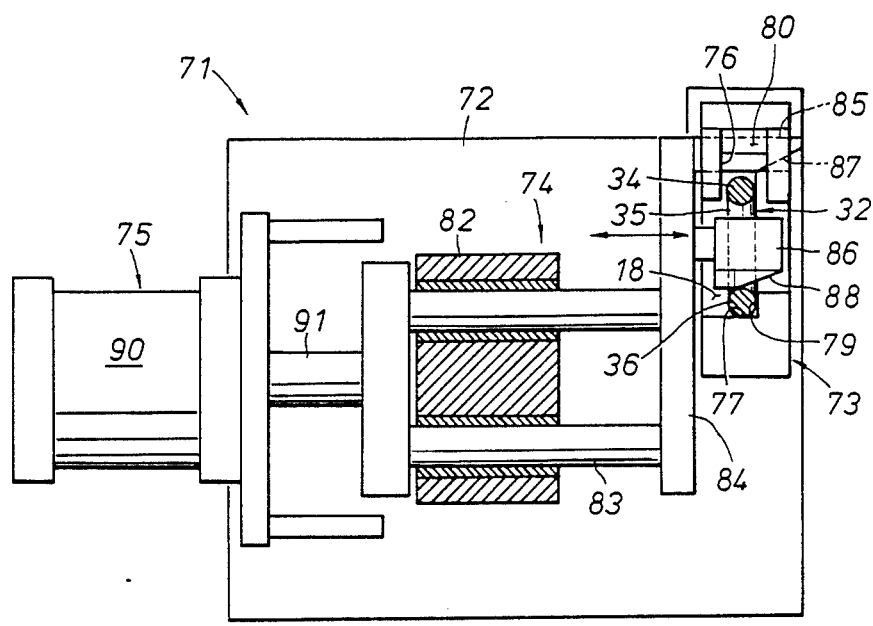
FIG. 7 is a plan view of an embodiment of the retaining device according to the present invention partly in section.
Figure 8:
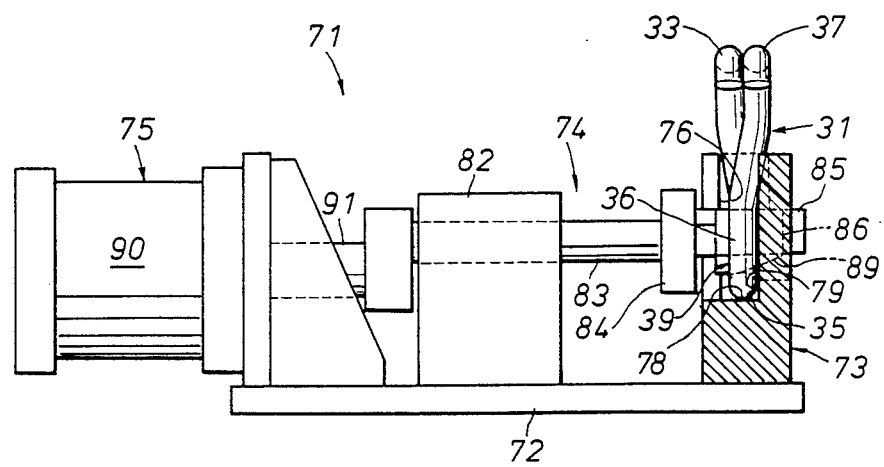
FIG. 8 is a side view of the retaining device of FIG. 7 partly in section.

FIGS. 7 through 9 show the retaining device 71 for an attachment member constructed according to the present invention. This retaining device 71 consists of a receptacle portion 73, a pressure unit 74 and a drive unit 75 which are secured on a common base 72.

The receptacle portion 73 is provided with a support groove 76 for loosely receiving the U-shaped portion 9 of the hook member 31. This support groove 76 has an open upper end, a front wall 77 and a bottom wall 78 which are in contact with the outer circumferential surfaces of the second vertical portion 36 and the horizontal portion 35 of the U-shaped portion 39, side walls 79 which are in contact with a plane defined by a first vertical portion 34, a second vertical portion 36 and the horizontal portion 35 of the U-shaped portion 39, and a rear wall 80 which opposes the first vertical portion 34 of the U-shaped portion 39. An upper part of the rear wall 80 is obliquely cut away. A front part of the bottom wall 78 is provided with a projection 81 which is made of an elastic material such as rubber and can relatively readily deform (refer to FIG. 9).

The pressure unit 74 is provided with a slider 83 which is guided by a guide block 82 fixedly secured on the base 72 so as to be slidable along a direction perpendicular to the plane defined by the U-shaped portion 9, and a first pusher member 85 and a second pusher member 86 which are mounted on a head 84 of the slider 83.

The first pusher member 85 is disposed so as to slide within a cavity in the rear wall 80 of the support groove 76 which is obliquely cut off, and is provided, at its free end, with a tapered surface 87 which opposes the external surface of the first vertical portion 36 of the hook member 37 received in the support groove 76.

The second pusher member 86 is adapted to move into the interior of the U-shaped portion 39 of the hook member 31 received in the support groove 76, and is provided with tapered surfaces 88 and 89 so as to oppose the internal surfaces of the second vertical portion 36 and the horizontal portion 35, respectively.

The drive unit 75 comprises a cylinder actuator 90 which undergoes a linear reciprocating movement, actuated by pneumatic or hydraulic power, and the pressure unit 74 is actuated by the thrust from the piston rod 91 of the cylinder actuator 90.

Now the operation of the above described embodiment is described in the following with reference to FIGS. 7 through 9.

First of all, the hook member 31 is fed from the parts feeder 21 (FIG. 1) with its engagement portion 38 directed upward and its second vertical portion 36 directed leftward in FIG. 9. At the same time, the piston rod 91 of the cylinder actuator 90 is retracted so as to place the first pusher member 85 and the second pusher member 86, along with the slider 83 and the head 84, out of the support groove 76. A hook member 31 is then placed into the support groove 76 by means of the robot 20 or the like.

The center of gravity of the hook member 31 is determined such that the engagement portion 38 may fall rightward when the hook member 31 is placed in the support groove 76 with the engagement portion 38 directed upward as shown by the imaginary lines in FIG. 9, and this position of the hook member 31 is positively maintained by the projection 81 provided in the bottom wall 78 of the support groove 76 abutting the U-shaped portion 76.

Then, the seat frame pipe 18a is conveyed to a prescribed position located above the device of the present invention by means of the robot 20 or the like. Here, since the engagement portion 38 is located on the right hand side in FIG. 9, it is possible to convey the seat frame pipe 18a without being interfered by the engagement portion 38.

As the drive unit 75 pushes out the pusher unit 74, the tapered surface 87 of the first pusher member 85 abuts the first vertical portion 34 of the U-shaped portion 39. As a result, the hook member 31 is forced into an upright position. At this stage, since the second pusher member 86 is not fully engaged with the U-shaped portion 39, and the hook member 31 is allowed to move slightly upward within the support groove 76, the engagement portion 38 can move over the upper surface of the seat frame pipe 18a.

As the pusher unit 74 is pushed out further, the tapered surfaces 88 and 89 of the second pusher member 86 ultimately engage with the internal surfaces of the horizontal portion 35 and the second vertical portion 36 of the U-shaped portion 39. As a result, the position and the orientation of the hook member 31 is defined in the support groove 76 by the horizontal portion 35 and the second vertical portion 36 of the U-shaped portion being pushed against the front wall 79, the bottom wall 78 and one of the side walls 79 of the support groove 76, respectively, the projection 81 being depressed as a result. The engagement portion 38 is then wrapped around the outer circumferential surface of the seat frame pipe 18a, and the deviation of the seat frame pipe 18a along its longitudinal direction is also corrected.

Thus, the preparation for the succeeding welding process is completed.

Thus, according to the present invention, it is possible to position a hook member, serving as an attachment member to a seat frame pipe which constitutes the object of attachment, both accurately and reliably, by means of a very simple structure. Furthermore, the position of the hook member can be securely retained. Therefore, the possibility of the movement of the attachment member is eliminated as the attachment member is being welded to a rod-shaped member having such a U-shaped portion, and a significant advantage can be gained in improving mounting accuracy and saving labor cost.

What we claim is:

1. A device for retaining an attachment member having a first engagement portion for engagement with an outer circumferential surface of a rod-like member at its one end and a second engagement portion for engagement with another member at its other end, comprising:

a receptacle for receiving a main part of said attachment member with some play;

elastic means for retaining said main part of said attachment member at its first position for keeping said rod-like member and said first engagement portion from interfering with each other when said rod-like member is brought into a preliminary position for engagement with said first engagement portion after said attachment member is received in said receptacle; and pressure means for bringing said attachment member to its second position for engaging said first engagement portion with said rod-like member against a biasing force of said elastic means.

2. A device for retaining an attachment member according to claim 1, wherein said first engagement portion consists of a hooked portion which is to be wrapped around said rod-like member over a certain angle.

3. A device for retaining an attachment member according to claim 2, wherein:

said main part of said attachment member is provided with at least one U-shaped opening;

said receptacle is provided with a bearing surface which supports a bottom surface of a bottom portion of said U-shaped portion and an outer side surface of a side portion of said U-shaped portion; and said pressure means is provided with a pair of tapered surfaces which can contact inner surfaces of said bottom portion and said side portion and is disposed so as to be able to move toward and away from said opening.

4. A device for retaining an attachment member according to claim 1, wherein said elastic means consists of a piece of rubber projecting from an inner wall surface of said receptacle.

5. A device for retaining an attachment member according to claim 1, wherein said retaining device is a part of a welding station for welding said attachment member to said rod-like member.

* * * * *